(12) United States Patent
Oyama et al.

(10) Patent No.: US 11,392,280 B2
(45) Date of Patent: Jul. 19, 2022

(54) IMAGE SELECTION APPARATUS

(71) Applicant: Honda Motor Co., Ltd., Tokyo (JP)

(72) Inventors: Takahiro Oyama, Tokyo (JP); Yuki Hagiwara, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/276,145

(22) PCT Filed: Sep. 18, 2019

(86) PCT No.: PCT/JP2019/036484
§ 371 (c)(1),
(2) Date: Mar. 13, 2021

(87) PCT Pub. No.: WO2020/066772
PCT Pub. Date: Apr. 2, 2020

(65) Prior Publication Data
US 2022/0035497 A1 Feb. 3, 2022

(30) Foreign Application Priority Data
Sep. 27, 2018 (JP) .............................. JP2018-181459

(51) Int. Cl.
*G06F 3/048* (2013.01)
*G06F 3/0484* (2022.01)
(Continued)

(52) U.S. Cl.
CPC .......... *G06F 3/0484* (2013.01); *G06F 3/0482* (2013.01); *G06F 3/04817* (2013.01); *G06Q 10/083* (2013.01)

(58) Field of Classification Search
CPC .. G06F 3/0484; G06F 3/04817; G06F 3/0482; G01C 21/367; G01C 21/3664; G01C 21/365; G01C 21/26
See application file for complete search history.

(56) References Cited

U.S. PATENT DOCUMENTS 9,872,163 B1 * 1/2018 Cooper ................ H04W 24/08
11,099,028 B2 * 8/2021 Dubielzyk ........... G01C 21/367
(Continued)

FOREIGN PATENT DOCUMENTS

JP 2003111063 A 4/2003
JP 2016053777 A 4/2016

OTHER PUBLICATIONS

Motta et al., Personal Mobility service System in Urban Areas: The IRMA Project; 2015; IEEE; 10 pages.*
(Continued)

*Primary Examiner* — Linh K Pham
(74) *Attorney, Agent, or Firm* — Duft & Bornsen, PC

(57) ABSTRACT

Image selection apparatus includes: information acquisition unit and server information acquisition unit configured to acquire position information of plurality of moving objects; display unit; display stop unit configured to input an image stop command; display control unit configured to control the display unit so that a plurality of icon images corresponding to the plurality of moving objects whose position information is acquired by the information acquisition unit and server information acquisition unit is displayed on the display unit and, when the image stop command is inputted by the display stop unit, motion of the plurality of icon images displayed on the display unit is stopped; and collection destination assignment unit configured to select an arbitrary icon image from among the plurality of icon images in response to user operation during the motion of the plurality of icon images is stopped by the display control unit.

6 Claims, 12 Drawing Sheets

(51) Int. Cl.
*G06F 3/04817* (2022.01)
*G06F 3/0482* (2013.01)
*G06Q 10/08* (2012.01)

(56) References Cited

U.S. PATENT DOCUMENTS

| | | | | |
|---|---|---|---|---|
| 2003/0169340 | A1* | 9/2003 | Kamijo | G06T 7/262 |
| | | | | 348/169 |
| 2004/0054647 | A1* | 3/2004 | Inaba | H04M 3/42 |
| 2013/0246301 | A1* | 9/2013 | Radhakrishnan .. | G06Q 30/0282 |
| | | | | 705/347 |
| 2014/0129951 | A1* | 5/2014 | Amin | G06Q 30/0621 |
| | | | | 715/738 |
| 2017/0012920 | A1* | 1/2017 | Chheda | H04W 4/02 |
| 2017/0017374 | A1 | 1/2017 | Herz | |
| 2017/0031356 | A1 | 2/2017 | Bell | |
| 2017/0330193 | A1* | 11/2017 | Tolson | G06Q 30/01 |
| 2018/0350144 | A1* | 12/2018 | Rathod | G06T 13/40 |
| 2019/0228646 | A1* | 7/2019 | Bermudez | G08G 1/202 |

OTHER PUBLICATIONS

Situ et al.; A Parallel Ant Colony System Based on Region Decomposition for Taxi-Passenger Matching; © 2017; IEEE; 8 pages.*
International Preliminary Report on Patentability; PCT/JP2019/036484; dated Sep. 27, 2018.
International Search Report; PCT/JP2019/036484; dated Nov. 12, 2019.
Sudden Strike 4 game system released by square enix; Sep. 14, 2017; https://www.4gamer.net.
Indian office action; Application 202117015919; dated Feb. 4, 2022.

* cited by examiner

IMAGE SELECTION APPARATUS

CROSS-REFERENCE TO RELATED APPLICATION

This application is a National Stage of PCT international application Ser. No. PCT/JP2019/036484 filed on Sep. 18, 2019 which designates the United States, incorporated herein by reference, and which is based upon and claims the benefit of priority from Japanese Patent Application No. 2018-181459, filed on Sep. 27, 2018, the entire contents of which are incorporated herein by reference.

TECHNICAL FIELD

This invention relates to an image selection apparatus for selecting images displayed on screen.

BACKGROUND ART

Conventionally, there is known a device for selecting a predetermined image displayed on a screen (for example, see Patent Literature 1). In the device disclosed in Patent Literature 1, on the image of the moving object imaged by a monitoring camera, the display of an operation marker is moved by the operation of an observer to select the image of the moving object.

CITATION LIST

Patent Literature

Patent Document 1: Japanese Unexamined Patent Publication No. 2003-111063

DISCLOSURE OF INVENTION

Problems to be Solved by the Invention

However, in the device described in Patent Literature 1, in a case where the moving object moves at a high speed, it is difficult to capture the image of the moving object by the operation marker, and it is difficult to select a desired image.

Means for Solving Problem

An aspect of the present invention is an image selection apparatus, including: a position information acquisition unit configured to acquire position information of a plurality of moving object moving toward a predetermined destination; a display unit configured to display a map screen; a display control unit configured to control the display unit so that a plurality of first icon image respectively corresponding to the plurality of moving object whose position information is acquired by the position information acquisition unit is displayed as a plurality of moving image moving on the map screen in response to motion of the plurality of moving object; and an input unit configured to input a command from a user to the plurality of first icon image. The command includes a stop command to stop motion of the plurality of first icon image and a selection command to select a specific first icon image from among the plurality of first icon image. The display control unit controls the display unit so that a second icon image corresponding to a new destination different from the predetermined destination is displayed on the map screen together with the plurality of the first icon image and, when the stop command is inputted by the input unit in response to operation by the user to the second icon image, motion of the plurality of first icon image is stopped.

Effect of the Invention

According to the present invention, it becomes possible to easily select images displayed on screen and corresponding to moving objects.

DESCRIPTION OF EMBODIMENT

Hereinafter, an embodiment of the present invention will be described below with reference to FIG. 1 to FIG. 10. The image selection apparatus according to the embodiment of the present invention can be used in various kinds of request processing systems for displaying moving service staff, service vehicles, or the like as a plurality of image icons, selecting an arbitrary image icon from among the icons, and requesting the one of the service staff, the service vehicles, or the like corresponding to the selected image icon to perform an operation. In the following, particularly, an example applied to a request processing system for a collection service, in which, at a collection and delivery center of a delivery company or a collection and delivery base of post offices or the like, a manager of the base receives a collection request and requests a collection agent visiting collection destinations to make the collection, is described. That is, the described is an example in which the collection is requested to the collection agent in charge of collection at the collection and delivery center of the delivery company or the collection and delivery base of the post offices by using the image selection apparatus.

The collections performed by a collection agent in such a collection service include daily collection performed at a predetermined collection destination (daily collection destination) at a predetermined time or time period and spot collection performed at a collection destination (spot collection destination) at a time period designated (designated time period) according to a collection request received in a spot manner (spot collection request). The base manager who receives the spot collection request at a delivery base designates the collection agent who visits the spot collection destination in the designated time period among the collection agents who visit the daily collection destinations. In such designation of the collection agent, in a case where designation is performed by selecting the icon image which is displayed on a map to correspond to the current position of the collection agent, it is difficult to select the icon image when the collection agent is moving at a high speed. Therefore, in this embodiment, the image selection apparatus is configured to be able to easily select the icon image which is displayed on the screen to correspond to the moving collection agent as follows.

Functional Configuration of Request Processing System 100

Figure 1:
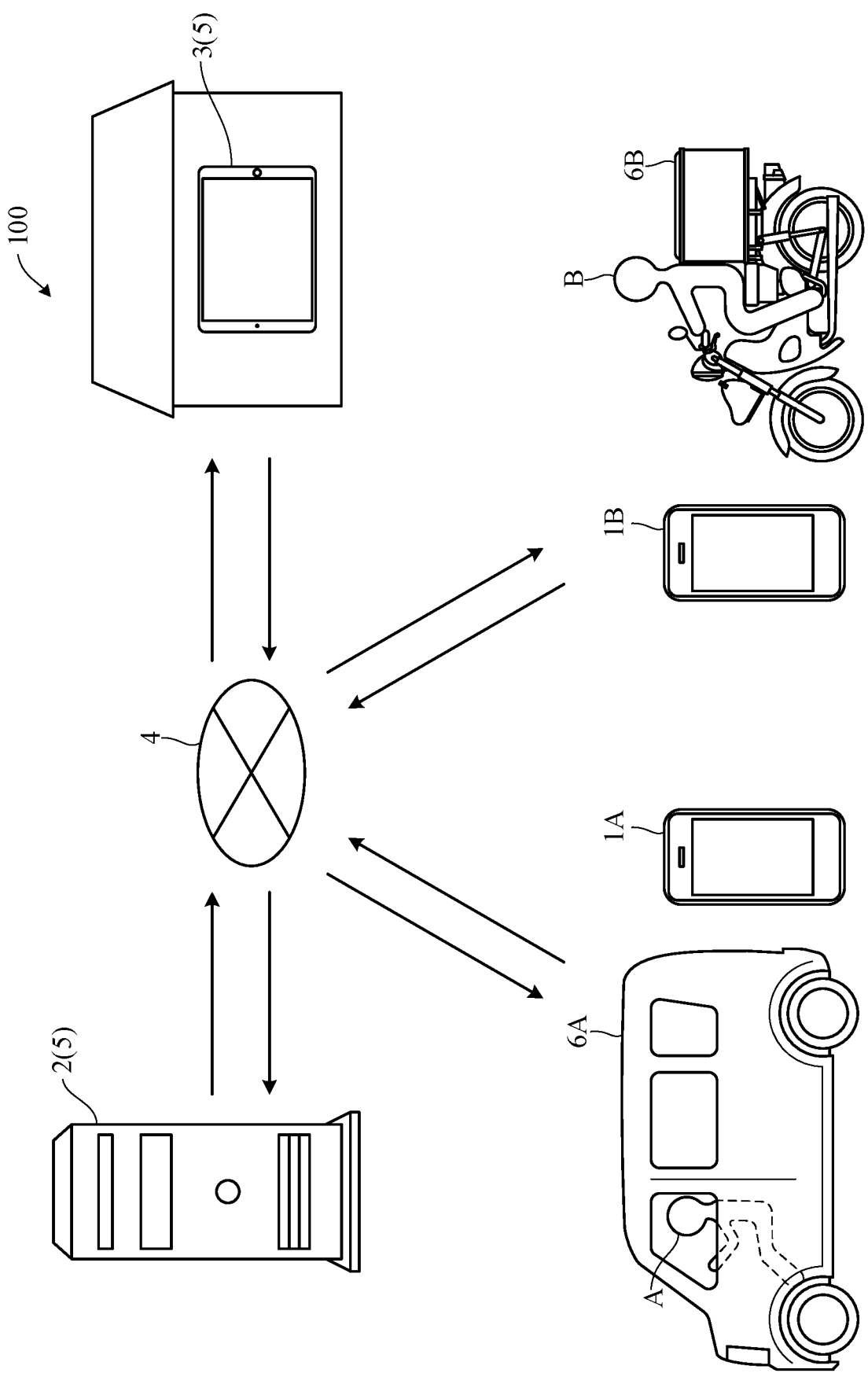
FIG. 1 is a diagram illustrating an example of the system configuration of a request processing system including an image selection apparatus according to an embodiment of the present invention.

First, a functional configuration of a request processing system 100 according to an embodiment of the present invention will be described. FIG. 1 is a diagram illustrating an example of the system configuration of the request processing system 100. As illustrated in FIG. 1, the request processing system 100 includes a plurality of (two in the drawing) collection agent terminals 1A and 1B, a management server 2, and a manager terminal 3 which are connected by a network 4 including a public wireless communication network represented by an Internet network, a mobile phone network, or the like. In such a request processing system 100, the management server 2 and the manager terminal 3 together configure an image selection apparatus 5 according to an embodiment of the present invention. Incidentally, the management server 2 or the manager terminal 3 may independently configure the image selection apparatus 5. Incidentally, the network 4 includes a closed communication network provided for each predetermined management area, for example, a wireless LAN and Wi-Fi (Wireless Fidelity) (registered trademark).

The collection agent terminals 1A and 1B can be stored in a pocket of clothes, a carry-on bag, a pouch, or the like or be installed in cradles or the like of vehicles 6A and 6B used at the time of collection to be used by collection agents A and B visiting the collection destinations. In this embodiment, smart phones, tablet terminals, cellular phones, PDAs (Personal Digital Assistant), and further various wearable terminals which can be connected to public wireless communication are collectively referred to as the collection agent terminals 1A and 1B. The collection agent terminals 1A and 1B have a common configuration. Incidentally, the number of the collection agent terminals 1A and 1B may be three or more. The vehicles 6A and 6B are transport vehicles such as a four-wheeled vehicle, a motorcycle, a bicycle, a handcart, and the like. As examples, FIG. 1 illustrates a light truck (for example, a truck having a predetermined exhaust volume or less) 6A and a motorized bicycle (for example, a motorcycle equipped with a prime mover having a predetermined exhaust volume or less) 6B which are widely used for the collection and delivery of packages and mail.

Next, the configurations of the collection agent terminals 1A and 1B, the management server 2, and the manager terminal 3 will be described.

Collection Agent Terminals 1A and 1B

First, the collection agent terminals 1A and 1B will be described. Various application software can be installed in the collection agent terminals 1A and 1B, and the collection agent terminals 1A and 1B according to this embodiment configure a request processing system by the application software installed in a smart phone. By using a commercially available smartphone, the cost of building the system can be reduced.

Figure 2:
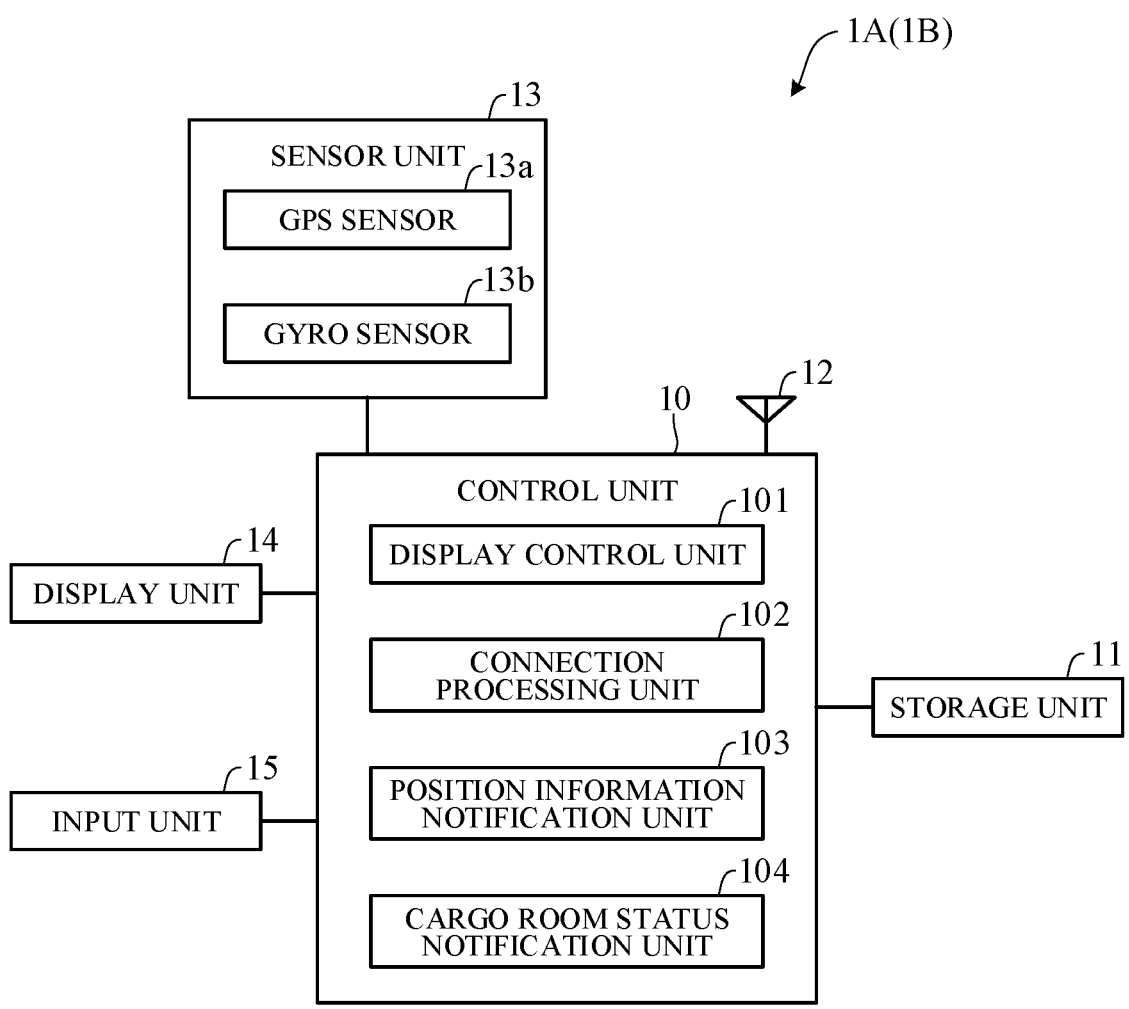
FIG. 2 is a block diagram illustrating a schematic configuration of a collection agent terminal in FIG. 1.

FIG. 2 is a block diagram illustrating a schematic configuration of the collection agent terminal 1A or 1B. As illustrated in FIG. 2, the collection agent terminal 1A includes a control unit 10, a storage unit 11, a wireless unit 12, a sensor unit 13, a display unit 14, and an input unit 15.

The storage unit 11 includes a semiconductor memory, a hard disk, and the like. The storage unit 11 stores various kinds of information such as an operating system (OS), software including an application program for supporting a collection operation, map information such as a road map and a house map, and customer information of a collection destination. The customer information includes information related to the customer such as the presence or absence of a home delivery box in addition to the address and telephone number of the collection destination. Incidentally, the software, the map information, and the customer information may be stored in advance in the storage unit 11 or may be acquired from the management server 2. Further, the storage unit 11 stores information including addresses (residence indication, latitude, longitude), telephone numbers, designated times, and the like of daily collection destinations assigned in advance to the collection agents A and B corresponding to the collection agent terminals 1A and 1B.

The wireless unit 12 has a DSP (Digital Signal Processor) or the like, and is configured to be capable of wireless communication with the management server 2 via a wireless communication network represented by a mobile phone network such as 3G, LTE, 4G, and 5G. The wireless unit 12 may be configured to include a proximity radio communication unit (not illustrated) to which a proximity radio communication technology such as Wi-Fi (registered trademark) and Bluetooth (registered trademark) can be applied. The wireless unit 12 can transmit a login ID (also called "collection agent ID") for identifying the collection agents A and B, the current position information of the collection agents A and B or the vehicles 6A and 6B, a cargo room status, and the like to the management server 2, and receive spot collection request information, and the like from the management server 2.

The sensor unit 13 includes a GPS sensor 13a for receiving positioning signals from a plurality of GPS satellites to measure absolute positions (latitude, longitude) of the collection agents A and B corresponding to the collection agent terminals 1A and 1B, and a gyro sensor 13b for detecting an angular velocity. The current position can also be calculated based on the basis of base station information of the wireless communication network acquired from the wireless unit 12. The traveling speeds (vehicle speed) of the vehicles 6A and 6B can be calculated from the time series changes of the position information acquired by the GPS sensor 13a. In a case where the reception of the positioning signal from the GPS satellite is impossible, the current positions of the collection agents A and B or the vehicles 6A and 6B can be calculated on the basis of the base station information acquired from the wireless unit 12 by using AGPS (Assisted Global Positioning System) communication.

The display unit 14 includes a display device such as a liquid crystal display or an organic EL panel. In response to an instruction from the control unit 10, the display unit 14 can displays a map, an icon of an operation button for a touch panel, and the like, and display various kinds of information such as the current positions of the collection agents A and B or the vehicles 6A and 6B and the map in the vicinity of the current position and the collection destination or display a list of the spot collection request information acquired from the daily collection destinations stored in the storage unit 11 or from the management server 2 in time series.

The input unit 15 includes a physical switch such as a numeric keypad operated by the collection agents A and B and an input device (not illustrated) such as a touch panel superimposed on the display surface of the display unit 14. A signal based on an operation input from the input unit 15, for example, the pressing of the numeric keypad by the collection agents A and B and the pressing of the touch panel is output to the control unit 10, whereby the collection agents A and B can perform operations such as switching of the screen display of the display unit 14.

Incidentally, although not illustrated, the collection agent terminals 1A and 1B may be additionally provided with speakers, vibrators, lights, microphones, and the like. The speaker, the vibrator, and the light notify various kinds of information to a collection agent by sound, vibration, and light. Further, the speaker outputs a voice to the collection agent, and the microphone collects the voice or the like emitted by the collection agent. Accordingly, various kinds of information can be outputted through the voice from the speaker, and various commands of the collection agent voice-inputted through the microphone can be inputted to the control unit 10 by using a voice recognition technology.

The control unit 10 includes a microprocessor having a CPU, a RAM, a ROM, an I/O, and the like. The CPU executes a program stored in advance, and exchanges signals with the storage unit 11, the wireless unit 12, the sensor unit 13, the display unit 14, and the input unit 15. The control unit 10 has, as a functional configuration, a display control unit 101, a connection processing unit 102, a position information notification unit 103, and a cargo room status notification unit 104.

The display control unit 101 generates an image signal in response to the operation of the input unit 15 or in response to the reception of the spot collection request information or the like by the wireless unit 12 and transmits the image signal to the display unit 14, thereby controlling the screen display by the display unit 14. The screen display displayed on the display unit 14 by the display control unit 101 includes a login screen for logging in to the request processing system 100, a cargo room status screen for inputting the loading status of the cargo room of the vehicles 6A and 6B and transmitting the loading status to the management server 2, a request check screen for displaying spot collection request information received from the management server 2, and the like. When receiving the spot collection request information from the management server 2 via the wireless unit 12, the display control unit 101 generates an image signal for displaying the request check screen and transmits the image signal to the display unit 14. When the spot collection request information is received, a notification command may be further transmitted to the speaker, the vibrator, or the light, and various kinds of information may be notified to the collection agent by sound, vibration, or light.

On the login screen displayed on the display unit 14, the connection processing unit 102 transmits the login ID and password inputted by the collection agents A and B via the input unit 15 to the management server 2 via the wireless unit 12. Accordingly, the collection agent terminals 1A and 1B are connected to the management server 2 in a communicable state. The login input by the collection agent is executed at the time of the operation start of the collection agent, that is, when the collection agent departs from the delivery base. Further, when logout is inputted through the input unit 15, the connection processing unit 102 transmits logout to the management server 2 through the wireless unit 12. Accordingly, the communication connection between the collection agent terminals 1A and 1B and the management server 2 is terminated. The logout input by the collection agent is executed at the time of the operation end of the collection agent, that is, when the collection agent returns to the delivery base. Incidentally, the logout may be automatically executed on the basis of the time and position information when the collection agent returns to the collection and delivery base.

The position information notification unit 103 transmits the current position information, which is calculated by signals from the sensor unit 13 (GPS Sensor 13a), of the collection agents A and B or the vehicles 6A and 6B moving together with the collection agent terminal 1A or 1B and the current time information acquired from a clock unit (not illustrated) via the wireless unit 12 to the management server 2 at predetermined time intervals (for example, every three seconds) in association with the collection agent ID. Incidentally, the time information includes not only the time but also information such as the date. The management server 2 can also calculate the moving speed and the traveling direction of the collection agent or the vehicle from the time series change of the position information of the vehicle.

The positions of the vehicles 6A and 6B change from time to time. Thus, when the current position information is acquired at predetermined time intervals, the position obtained from the latest current position information may not exactly coincide with the actual position. However, the deviation is small. Thus, the position obtained from the current position information acquired at predetermined time intervals can be regarded as the current position. Incidentally, a plurality of pieces of the current position information, the current time information, and the like of the collection agents A and B or the vehicles 6A and 6B acquired at predetermined time intervals can be collectively transmitted (so-called burst transmission) at once. The acquisition time interval (for example, every three seconds) of the current position information of the collection agent or the vehicle, the number of pieces to be transmitted at one time when a plurality of pieces are burst-transmitted collectively, and the like can be set in advance.

When the cargo room status is inputted on the cargo room status screen displayed on the display unit 14 through the input unit 15, the cargo room status notification unit 104 transmits the cargo room status to the management server 2 through the wireless unit 12 in association with the collection agent ID. The cargo room status is displayed to be selectable from a plurality of statuses indicating the status of the cargo room such as a situation in which the cargo room is full and no more collection is acceptable (100%), a situation in which a few more collection is acceptable (90%), a situation in which the cargo room is still a margin (60%), and a situation in which the cargo room is almost empty (30%).

Management Server 2

Next, the management server 2 will be described. The management server 2 is described as one server having various functions in this embodiment. However, the management server 2 may be a distribution server configured by different servers for functions or may be realized by a cloud server (virtual server).

Figure 3:
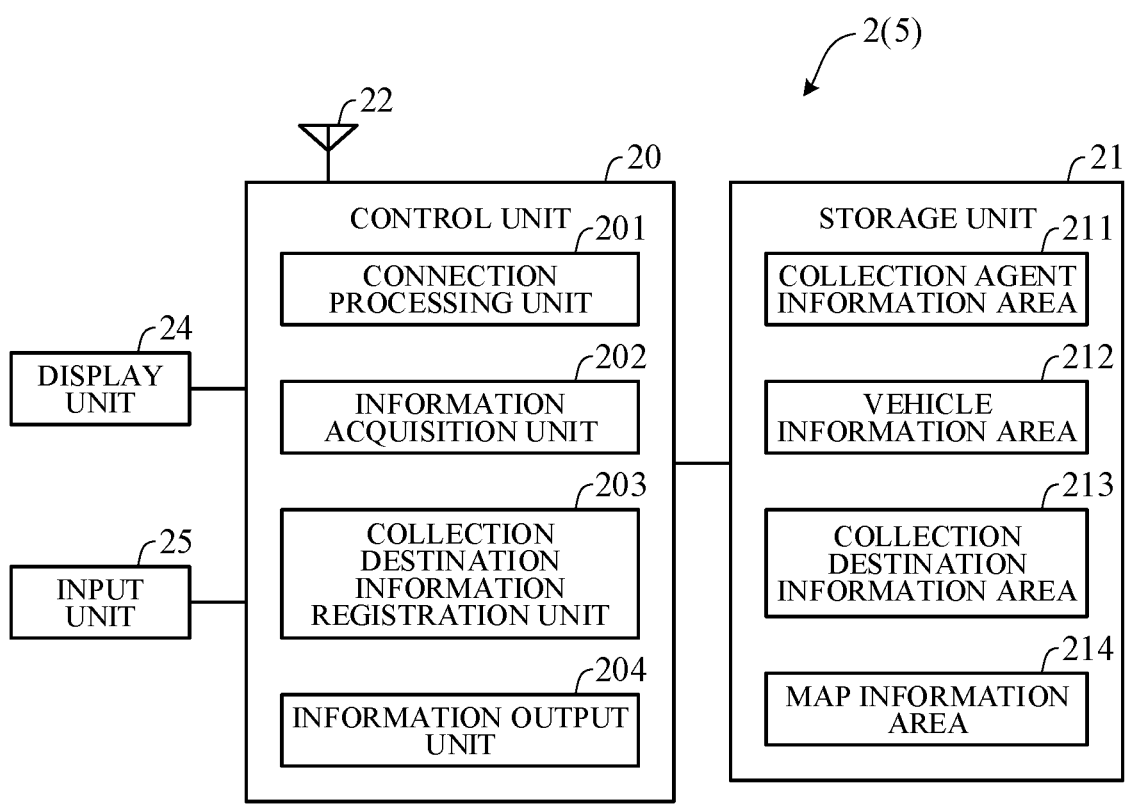
FIG. 3 is a block diagram illustrating a schematic configuration of a management server in FIG. 1.

FIG. 3 is a block diagram illustrating a schematic configuration of the management server 2. As illustrated in FIG. 3, the management server 2 includes a control unit 20, a storage unit 21, a communication unit 22, a display unit 24, and an input unit 25. Incidentally, the display unit 24 and the input unit 25 may be omitted. Further, the display unit 24 and the input unit 25 may be configured by another information terminal (not illustrated) connected to the management server 2.

The storage unit 21 includes a semiconductor memory, a hard disk drive, and the like. The storage unit 21 stores an operating system (OS), software called an application, and various kinds of other information. For this reason, the storage unit 21 secures various storage areas such as a collection agent information area 211, a vehicle information area 212, a collection destination information area 213, and a map information area 214. Incidentally, the information area is, for example, a table in a database management system.

The collection agent information area 211 stores, for each employee ID (also called "collection agent ID") which is the identification information of a collection agent, collection agent information for managing basic information on the corresponding collection agent, for example, the name of the collection agent, an affiliation base ID, and workable time. Further, in the collection agent information area 211, a vehicle ID which is the identification information of the vehicles 6A and 6B is stored in association with the collection agent ID. The correspondence of the vehicle ID to the collection agent ID is set in advance, for example, by the manager of the delivery base prior to the start of the daily collection management operation.

In the vehicle information area 212, for each vehicle ID, the information relating to the corresponding vehicle, for example, the vehicle type such as a four-wheeled vehicle, a motorcycle, and a bicycle, the size of a cargo room, and the like are stored in advance, and the cargo room statuses received from the collection agent terminals 1A and 1B are stored.

In the collection destination information area 213, the daily collection destination information including the address (residence indication, latitude, longitude) of a daily collection destination, a telephone number, a designated time, and the collection agent A or B assigned to the collection destination is stored in advance, and the spot collection request information including the address (residence indication, latitude, longitude) of the spot collection destination newly received from the manager terminal 3, a telephone number, collection contents, a designated time period, and the like is stored. Further, when the spot collection request is assigned to the collection agents A and B, the information of the collection agent IDs of the assigned collection agents A and B and the vehicle IDs of the vehicle 6A and 6B is also stored.

Map information is stored in advance in the map information area 214. The map information includes road link information, display map data for displaying the background of a road, a road map, and the like, road type information (general roads or expressways), and the like. These map information are periodically updated.

When transmitting/receiving with the collection agent terminal 1A or 1B, the communication unit 22 implements a communication protocol, such as 3G, LTE, 4G, and 5G, capable of performing wireless communication. On the other hand, when transmitting/receiving with the manager terminal 3, the communication unit 22 implements a communication protocol capable of performing wired communication (for example, Internet lines) or wireless communication.

The control unit 20 includes a processor having a CPU, a RAM, a ROM, an I/O, and the like. The control unit 20 has, as a functional configuration, a connection processing unit 201, an information acquisition unit 202, a collection destination information registration unit 203, and an information output unit 204.

The connection processing unit 201 executes login processing from the collection agent terminals 1A and 1B and performs connection processing with the collection agent terminals 1A and 1B. Further, the connection processing unit 201 executes logout processing from the collection agent terminals 1A and 1B and terminates the connection with the collection agent terminals 1A and 1B. Further, the connection processing unit 201 executes login processing from the manager terminal 3 to perform connection processing with the manager terminal 3, and executes logout processing from the manager terminal 3 to terminate the connection with the manager terminal 3.

The information acquisition unit 202 acquires various kinds of information by receiving the data transmitted from the collection agent terminals 1A and 1B to the management server 2 and the data transmitted from the manager terminal 3 to the management server 2 through the communication unit 22. The information acquired by the information acquisition unit 202 includes the position information of the collection agents A and B or the vehicles 6A and 6B transmitted from the position information notification units 103 of the collection agent terminals 1A and 1B and the time information corresponding to the position information (current position information), the cargo room status of the vehicles 6A and 6B transmitted from the cargo room status notification unit 104, the spot collection request information transmitted from the manager terminal 3, and the like. Specifically, the position information is expressed in latitude and longitude.

The collection destination information registration unit 203 registers a collection destination data record in the collection destination information area 213 and corrects the record. That is, in a case where the information of registration and correction of the daily collection destination information is received from the manager terminal 3, the daily collection destination information stored in the collection destination information area 213 is registered and corrected on the basis of the received information. Further, in a case where the spot collection request is assigned to the collection agents A and B, the information (collection agent IDs) of the assigned collection agents A and B is added to the collection destination information area 213.

The daily collection destination information stored in advance in the collection destination information area 213 is managed for each of the collection agents A and B (collection agent ID) and for each collection time period. The collection time period is a predetermined time period for each delivery base, and a spot collection request to the delivery base is received for each same time period.

The information output unit 204 outputs various kinds of information by transmitting data from the management server 2 via the communication unit 22 to the collection agent terminals 1A and 1B and the manager terminal 3. The information output by the information output unit 204 includes the current position information of the collection agents A and B or the vehicles 6A and 6B transmitted to the manager terminal 3, the spot collection request information transmitted to the collection agent terminals 1A and 1B, and the like. The manager refers to the current position information of the collection agents A and B or the vehicles 6A and 6B transmitted from the management server 2, and assigns the spot collection request to the collection agents A and B through the manager terminal 3. The information output unit 204 transmits the spot collection request information to the collection agents A and B to which the spot collection request is assigned according to the assignment result of the collection agent by the manager.

Manager Terminal 3

Next, the manager terminal 3 will be described. The manager terminal 3 is used by the manager of the delivery base to manage the collection agent who visits the collection destination. The manager terminal 3 includes various computers such as a personal computer, a tablet type terminal, and a smart phone installed in a delivery base, and transmits and receives information to and from the management server 2 through the network 4.

Figure 4:
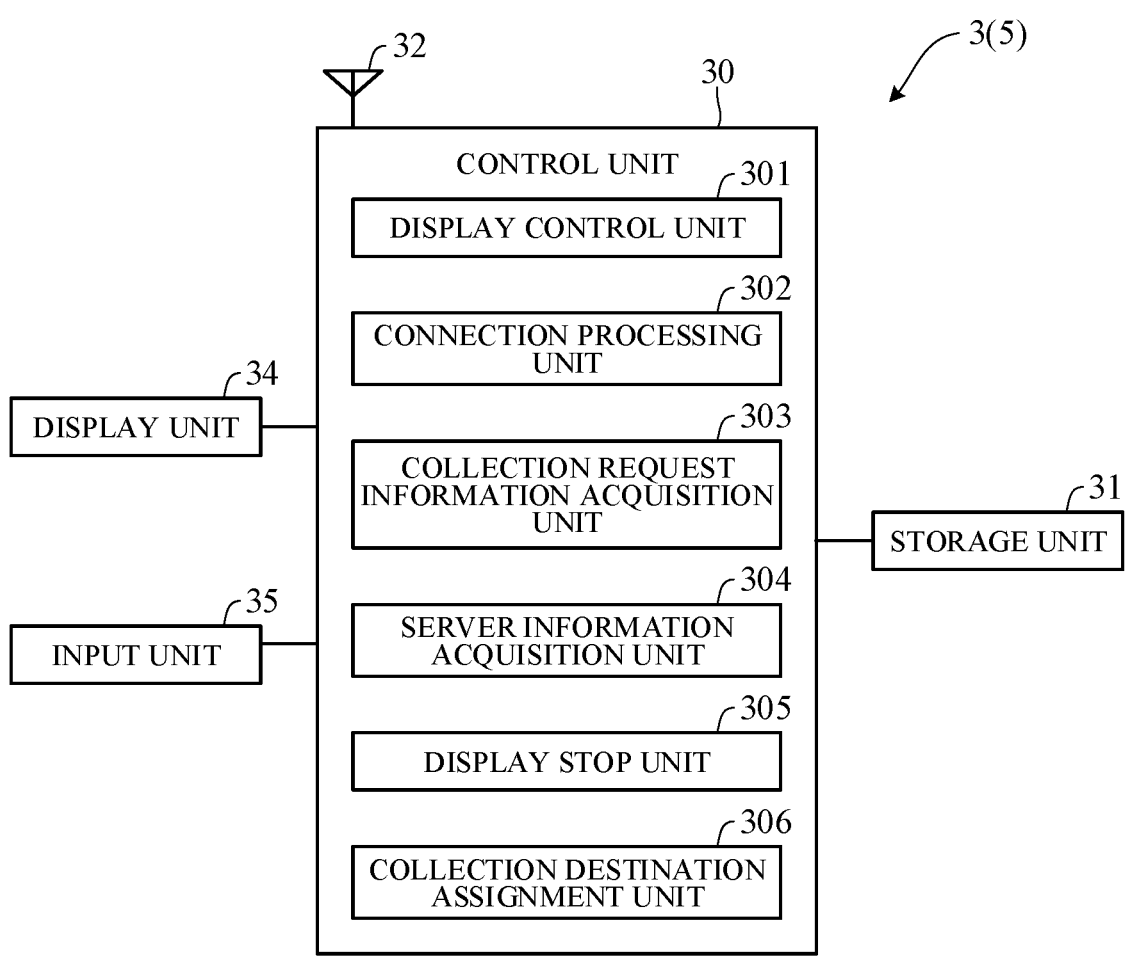
FIG. 4 is a block diagram illustrating a schematic configuration of a manager terminal in FIG. 1.

FIG. 4 is a block diagram illustrating a schematic configuration of the manager terminal 3. As illustrated in FIG. 4, the manager terminal 3 includes a control unit 30, a storage unit 31, a communication unit 32, a display unit 34, and an input unit 35.

The storage unit 31 includes a semiconductor memory, a hard disk drive, and the like. The storage unit 31 stores an operating system (OS), software called an application, and various kinds of other information.

The communication unit 32 implements a communication protocol capable of performing wired communication (for example, Internet lines) or wireless communication such as 3G, LTE, 4G, and 5G, and is connected to the management server 2 to transmit and receive various kinds of data.

The display unit 34 is configured by a display device such as a liquid crystal display or an organic EL panel. In response to an instruction from the control unit 30, a map, an icon of an operation button for a touch panel, and the like are displayed. Further, on the basis of the current position information of the collection agents A and B or the vehicles 6A and 6B transmitted from the information output unit 204 of the management server 2, the display unit 34 can display various kinds of information such as the current position of the collection agents A and B or the vehicles 6A and 6B to be superimposed on the map in the vicinity of the spot collection destination (collection agent designation screen).

The input unit 35 includes a physical switch such as a numeric keypad operated by the manager and an input device (not illustrated) such as a touch panel superimposed on the display surface of the display unit 34. A switching command of the display screen of the display unit 34 is inputted through the input unit 35. The designation (the assignment of the spot collection destination) of the collection agents A and B can be performed through the input unit 35.

The control unit 30 includes a processor having a CPU, a RAM, a ROM, an I/O, and the like. The control unit 30 has, as a functional configuration, a display control unit 301, a connection processing unit 302, a collection request information acquisition unit 303, a server information acquisition unit 304, and a display stop unit 305, and a collection destination assignment unit 306.

The display control unit 301 generates an image signal in response to the operation of the input unit 35 and transmits the image signal to the display unit 34 to control the screen display by the display unit 34. The screen displayed on the display unit 34 by the display control unit 301 includes a login screen for logging in to the request processing system 100, a request input screen for inputting spot collection request information, a collection agent designation screen for designating a collection agent to which the spot collection request is assigned, and the like.

The connection processing unit 302 executes login processing to the management server 2 by using, for example, an identification number (base manager ID) for identifying the delivery base (manager or responsible person) and a password.

A collection request information acquisition unit 303 acquires the spot collection request information which is received by the manager from the customer through the window of the delivery base, a telephone, the Internet, and the like to be inputted through the input unit 35 and stored in the storage unit 31. The collection request information acquisition unit 303 transmits the spot collection request information to the management server 2 through the communication unit 32. The spot collection request information includes the address (residence indication, latitude, longitude) or the telephone number of the spot collection destination, collection contents, a designated time period, and the like.

The server information acquisition unit 304 acquires the information transmitted from the management server 2 (information output unit 204), for example, the current position information of the collection agents A and B or the vehicles 6A and 6B.

Figure 5:
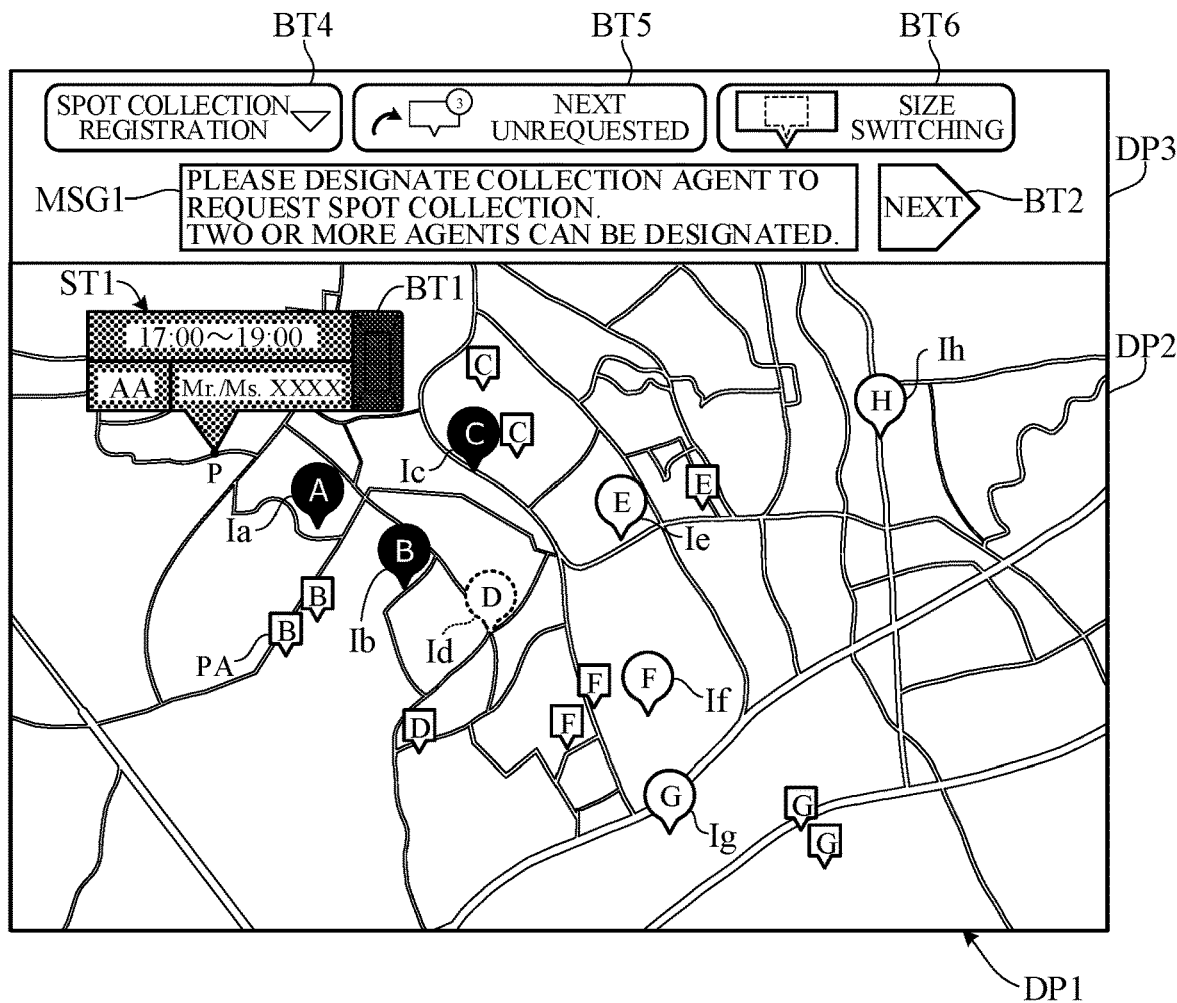
FIG. 5 is a diagram illustrating an example of a collection agent designation screen in FIG. 4, when designating a collection agent.
Figure 6:
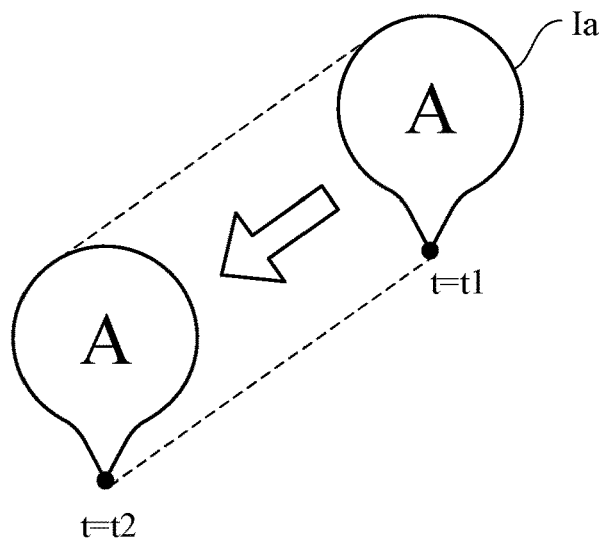
FIG. 6 is a diagram for explaining screen display of the collection agent designation screen.

FIG. 5 is a diagram illustrating an example of a collection agent designation screen DP1 of the manager terminal 3 at the time of designating a collection agent, and FIG. 6 is a diagram for explaining the screen display of the collection agent designation screen DP1. As illustrated in FIG. 5, the collection agent designation screen DP1 is configured by a map display area DP2 in which icon images Ia to Ih indicating the current position of the collection agent (eight collection agents A to H in the drawing) are displayed to be superimposed on the peripheral map of the spot collection destination P, and a menu area DP3 in which various buttons and messages and the like are displayed. In addition to the icon images Ia to Ih indicating the current positions of the respective collection agents, a plurality of icon images PA indicating the positions of collection destinations assigned to the respective collection agents are displayed in a display form different from the icon images Ia to Ih in the map display area DP2. For example, in FIG. 5, the icon images PA indicating the positions of the collection destinations assigned to the collection agents B to G are displayed. The icon images Ia to Ih can be changed according to the statuses of the collection agents A to H. For example, the icon image Id of the collection agent D whose the position information is not communicated for a certain period of time (for example, three minutes) or more is displayed as a broken line, and the icon images Ia to Ic of the collection agents A to C for which the cargo room status is a certain percentage (for example, 90%) or more are displayed in reverse.

The icon images Ia to Ih of each collection agent change from time to time in accordance with the current position information and the like transmitted from respective collection agent terminals (1a, 1b, and the like of FIG. 1). That is, the display is updated at a predetermined time interval (for example, every three seconds). Specifically, as illustrated in FIG. 6, in a case where the collection agent A or the vehicle 6A is moving, the display position of the icon image Ia on the map display area DP2 changes, as indicated by an arrow, before the display is updated (t=t1) and after the display is updated (t=t2). Thus, the selection operation (pressing of touch panel) when the manager selects the icon image Ia is difficult.

As illustrated in FIG. 5, the map display area DP2 further displays an icon image ST1 indicating the spot collection destination P and the processing status of the spot collection request or the like. In the icon image ST1, a designation start button BT1 for starting the designation of a collection agent is displayed to be selectable. When the manager presses the designation start button BT1 through the input unit 35 (touch panel), the display stop unit 305 inputs an image stop command for stopping the movement display of the icon images Ia to Ih. While the movement display of the icon images Ia to Ih is stopped, a message MSG1 indicating that the designation of the collection agent is possible and a button BT2 for advancing to the next operation screen are displayed in the menu area DP3 of the collection agent designation screen DP1. When the image stop command is input, the display control unit 301 controls the screen display by the display unit 34 to stop the moving display of the icon images Ia to Ih, that is, to fixedly display the icon images Ia to Ih at the display position at the time of pressing the designation start button BT1. The manager can select the icon images Ia to Ih fixedly displayed in accordance with a pressing operation through the input unit 35 (touch panel) or cancel the selection. For example, selection can be made in accordance with the pressing operation, and selection can be canceled in accordance with the pressing operation again. A plurality of icon images can be selected among the icon images Ia to Ih displayed fixedly. The icon images Id displayed in broken lines in accordance with the communication status and the icon images Ia to Ic displayed in reverse in accordance with the cargo room status may not be selectable.

When the icon images Ia to Ih are selected in response to the pressing operation by the manager through the input unit 35 (touch panel), the collection destination assignment unit 306 designates the collection agent corresponding to the selected icon image as the collection agent to which the spot collection request is to be transmitted. For example, the collection agent commanded through the input unit 35 is designated on the basis of the operation evaluation information of the collection agent, the traffic situation around the spot collection destination, and the like. At this time, the icon image selected by the manager is highlighted (icon image Ie of FIG. 7A and icon images Ie and If of FIG. 7B).

Figure 7A:
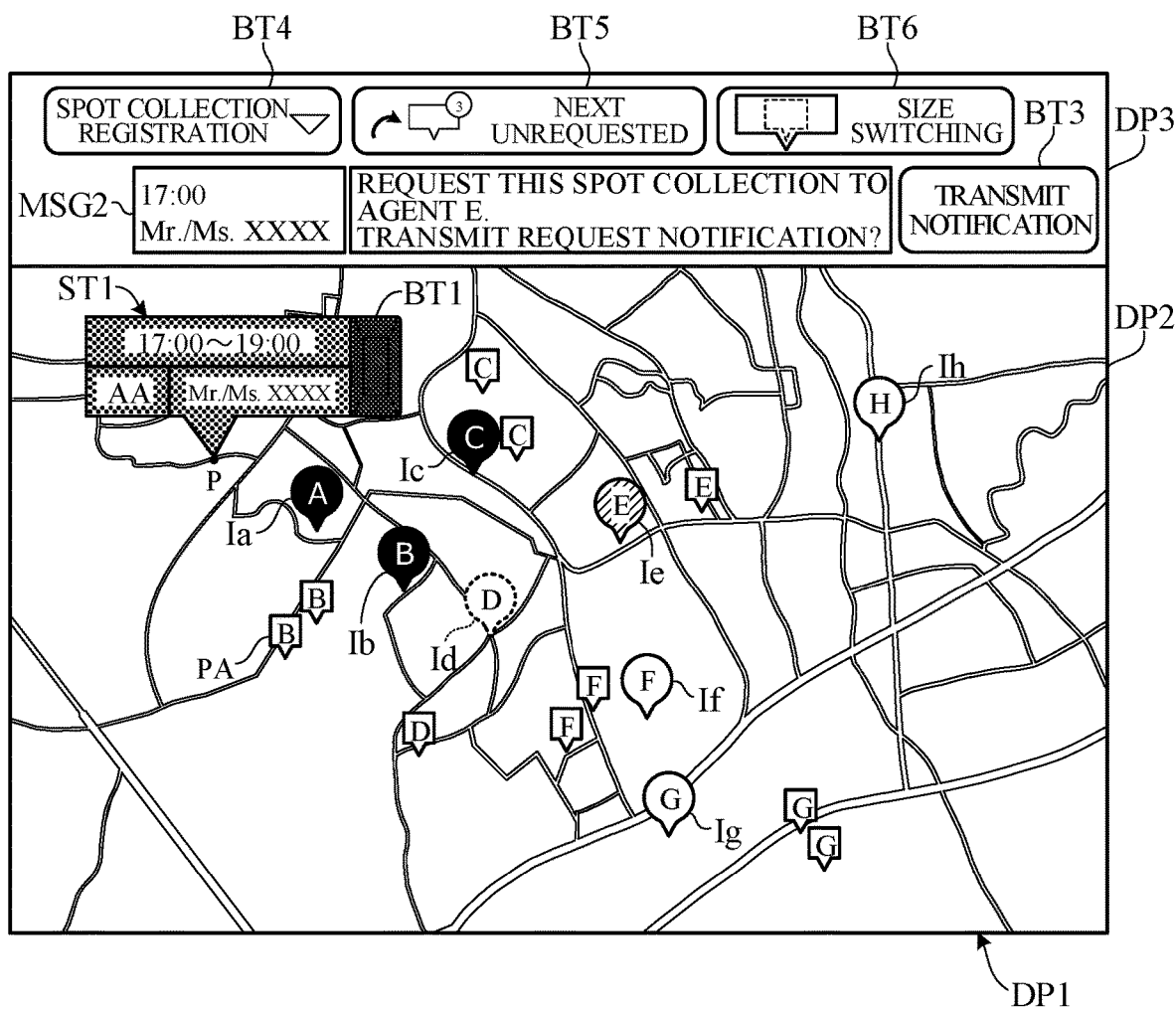
FIG. 7A is a diagram illustrating an example of the collection agent designation screen of the manager terminal in FIG. 4 after designating one collection agent.
Figure 7B:
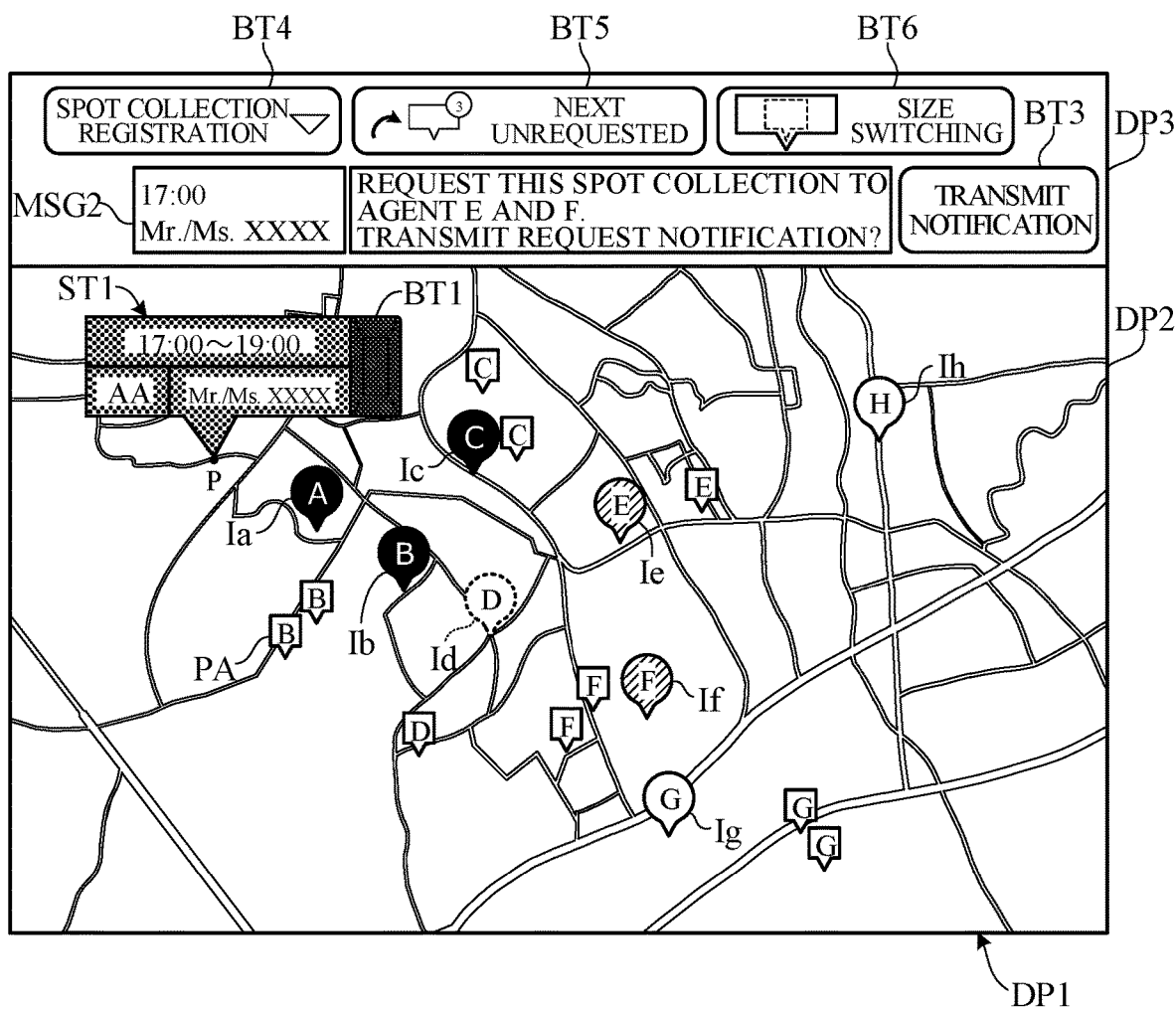
FIG. 7B is a diagram illustrating an example of the collection agent designation screen of the manager terminal in FIG. 4 after designating a plurality of collection agents.

FIG. 7A is a diagram illustrating an example of the collection agent designation screen DP1 of the manager terminal 3 after designating one collection agent (a collection agent E in the drawing), and FIG. 7B is a diagram illustrating an example of the collection agent designation screen DP1 of the manager terminal 3 after designating a plurality of collection agents (two collection agents E and F in the drawing). When one or more icon images Ia to Ih are selected on the collection agent designation screen DP1, then the button BT2 of FIG. 5 is pressed, and the manager designates the collection agent to which the spot collection request is assigned, a message MSG2 for checking whether to transmit the spot collection request information is displayed at the center of the menu area DP3. At this time, a transmission check button BT3 is displayed on the right portion of the menu area DP3. When the manager presses the transmission check button BT3 through the input unit 35 (touch panel), a transmission command for transmitting the spot collection request information is input to the collection agent corresponding to the selected icon image. This transmission command is transmitted through the communication unit 32 to the management server 2. When the transmission command is received by the information acquisition unit 202 of the management server 2 through the communication unit 22, the collection destination information registration unit 203 adds the information of the designated collection agent to the collection destination information area 213, and the information output unit 204 transmits the spot collection request information to the collection agent terminal of the designated collection agent.

Figure 8A:
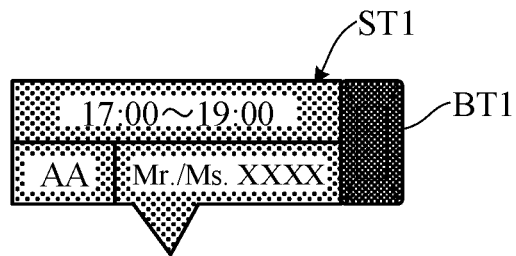
FIG. 8A is a diagram illustrating an example of display indicating processing status of spot collection request on the collection agent designation screen in FIG. 5, FIG. 7A and FIG. 7B, when spot collection is not requested yet.

FIG. 8A to FIG. 8F are diagrams illustrating an example of the display indicating the processing status of the spot collection request on the collection agent designation screen DP1 of FIG. 5 and FIG. 7. The icon image ST1 of FIG. 8A is the status display displayed when the spot collection is not requested to the collection agent yet. In the icon image ST1 illustrated in FIG. 8A, the designation start button BT1 is displayed to be selectable. When the designation start button BT1 is pressed, a standby state in which the collection agent to be sent a request for spot collection can be designated (input) is established on the collection agent designation screen DP1 of FIG. 5 and FIG. 7.

Figure 8B:
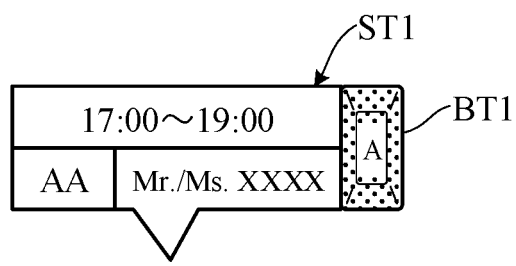
FIG. 8B is a diagram illustrating an example of display indicating processing status of the spot collection request on the collection agent designation screen in FIG. 5, FIG. 7A and FIG. 7B, when the request is not checked yet.
Figure 8C:
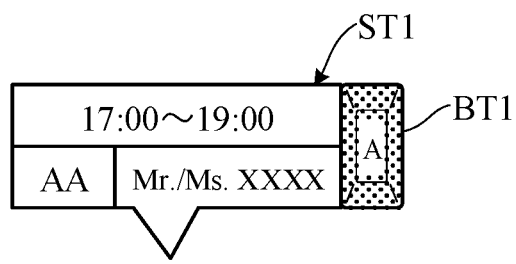
FIG. 8C is a diagram illustrating an example of display indicating processing status of the spot collection request on the collection agent designation screen in FIG. 5, FIG. 7A and FIG. 7B, when the request is not answered yet.
Figure 8D:
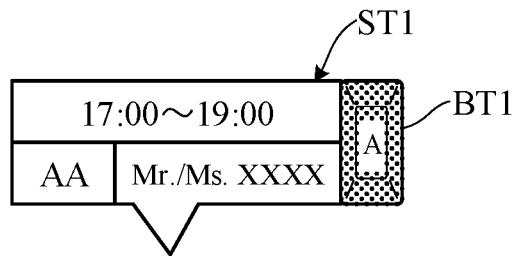
FIG. 8D is a diagram illustrating an example of display indicating processing status of the spot collection request on the collection agent designation screen in FIG. 5, FIG. 7A and FIG. 7B, when a predetermined period of time elapses without any answer to the request.

The icon image ST1 of FIG. 8B is the status display which is displayed when the spot collection is requested to the collection agents, but no collection agents requested for spot collection check the request. The icon image ST1 of FIG. 8C is the status display which is displayed when at least one of the collection agents requested for spot collection checks the request, but no answer to the request is transmitted by anyone. The icon image ST1 in FIG. 8D is the status display which is displayed when a predetermined period of time (for example, fifteen minutes) elapses without any one of the collection agents requested for spot collection answering to the request. The designation start button BT1 is displayed to be selectable on the icon images ST1 illustrated in FIG. 8B to FIG. 8D, and further the collection agent (A in the drawing) who has been requested for spot collection is superimposed on the designation start button BT1.

Figure 8E:
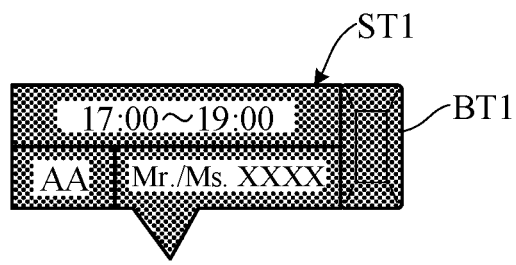
FIG. 8E is a diagram illustrating an example of display indicating processing status of the spot collection request on the collection agent designation screen in FIG. 5, FIG. 7A and FIG. 7B, when every one answered that the request cannot be accepted.

The icon image ST1 of FIG. 8E is the status display which is displayed when all the collection agents requested for spot collection answer that the collection agents cannot accept the request. Also in the icon image ST1 illustrated in FIG. 8E, the same designation start button BT1 as that of the icon image ST1 of FIG. 8A is displayed to be selectable.

Figure 8F:
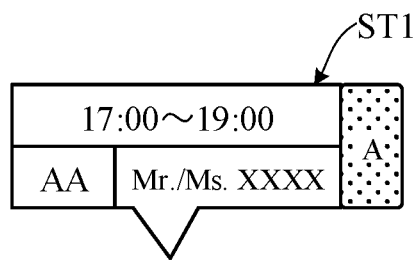
FIG. 8F is a diagram illustrating an example of display indicating processing status of the spot collection request on the collection agent designation screen in FIG. 5, FIG. 7A and FIG. 7B, when the collection agent who accepts the request makes a confirmation.

The icon image ST1 of FIG. 8F is the status display which is displayed when the collection agent who accepts the spot collection makes a confirmation. The icon image ST1 of FIG. 8F displays the collection agent (A in the drawing) who confirms the acceptance of the request. The icon image ST1 is hidden when the spot collection is completed.

The icon images ST1 of FIG. 8A to FIG. 8F are each displayed with a background color of a different shade. The manager who requests the spot collection can easily grasp the processing status of whether the requested collection agent checks the spot collection request requested by the manager or which collection agent accepts the request by checking the icon image ST1 of the collection agent designation screen DP1.

The screen display of the collection agent designation screen DP1 of FIG. 5 and FIG. 7 can be switched to the screen displays corresponding to the menu buttons BT4 to BT6 by pressing the respective menu buttons BT4 to BT6 such as "spot collection registration", "next unrequested" and "size switching" displayed in the menu area DP3. Specifically, when the menu button BT4 of "spot collection registration" is pressed, the screen is switched to a screen for registering a new spot collection. When the menu button BT5 of "next unrequested" is pressed, for the spot collection not yet requested to the collection agent, the screen is switched to a screen (map display area DP2) for displaying the peripheral map of the spot collection destination P thereof in the registration order. Further, when the menu button BT6 of "size switching" is pressed, the display sizes of all the icon images Ia to Ih, PA, and ST1 are changed at once. The menu button BT5 of "next unrequested" displays the number of spot collection requests not yet requested to the collection agent.

Figure 9A:
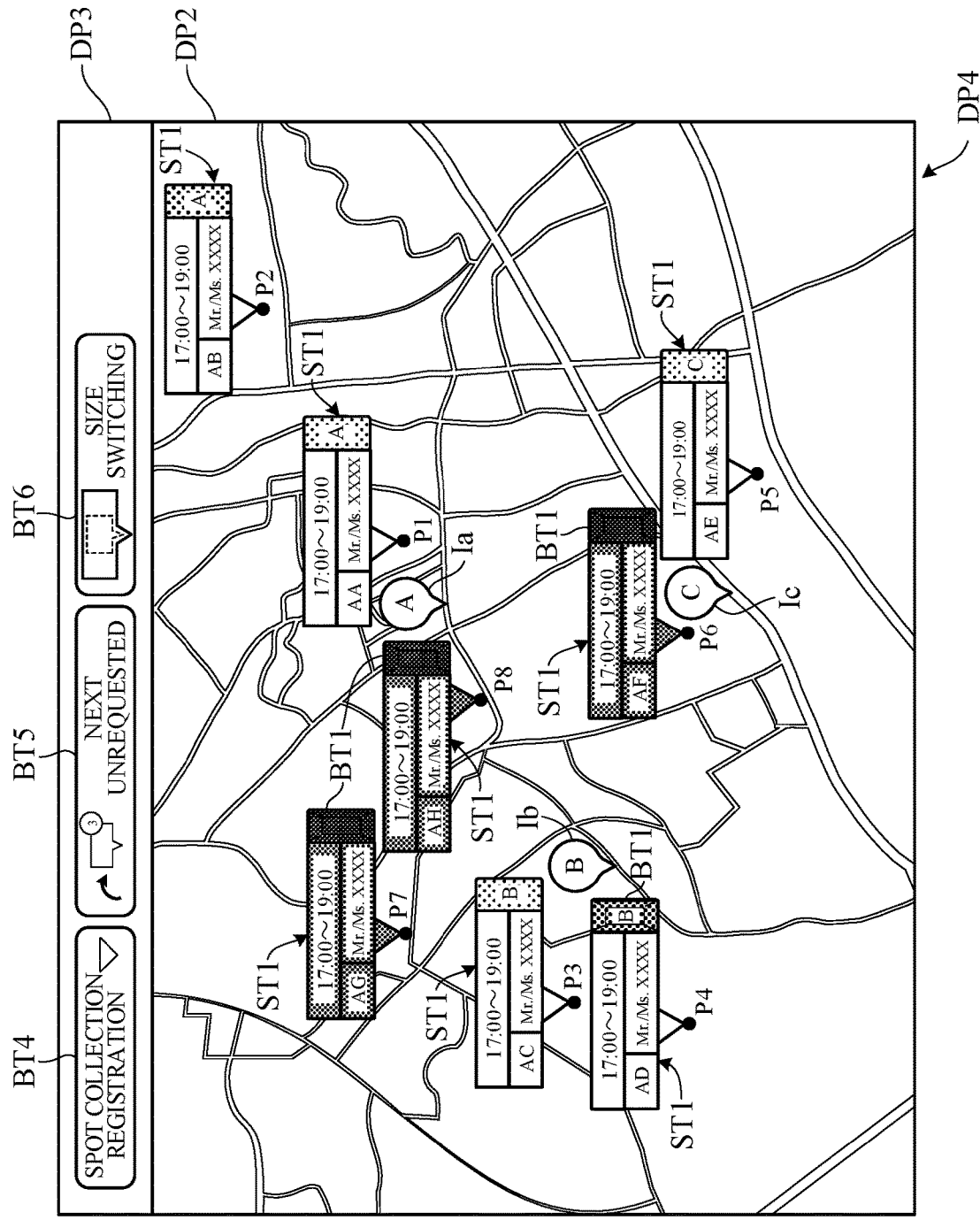
FIG. 9A is a diagram illustrating an example of a request status check screen of the manager terminal in FIG. 4.

FIG. 9A is a diagram illustrating an example of the request status check screen, and is a diagram illustrating an example of a request status check screen DP4 in a case where all the collection destinations of spot collection not yet requested to the collection agent are displayed. As illustrated in FIG. 9A, peripheral spot collection destinations P1 to P8 including the number (three in the drawing), which is displayed on the menu button BT5 of the "next unrequested" of the menu area DP3, of unrequested spot collection destinations P6 to P8 are displayed on the peripheral map of the map display area DP2. The map display area DP2 also displays the icon images Ia to Ic indicating the current positions of the peripheral collection agents (three collection agents A to C in the drawing) and the icon images ST1 indicating unrequested spot collection destinations P6 to P8. When the designation start button BT1 on each icon image ST1 is pressed, the screen display can be switched to the collection agent designation screen DP1 for requesting the spot collection for the spot collection destination P6 to P8 corresponding to each icon image ST1. The manager requesting the spot collection can easily grasp the positions of the unrequested spot collection destinations P6 to P8 and the current positions of the surrounding collection agents A to C by checking the request status check screen DP4.

Figure 9B:
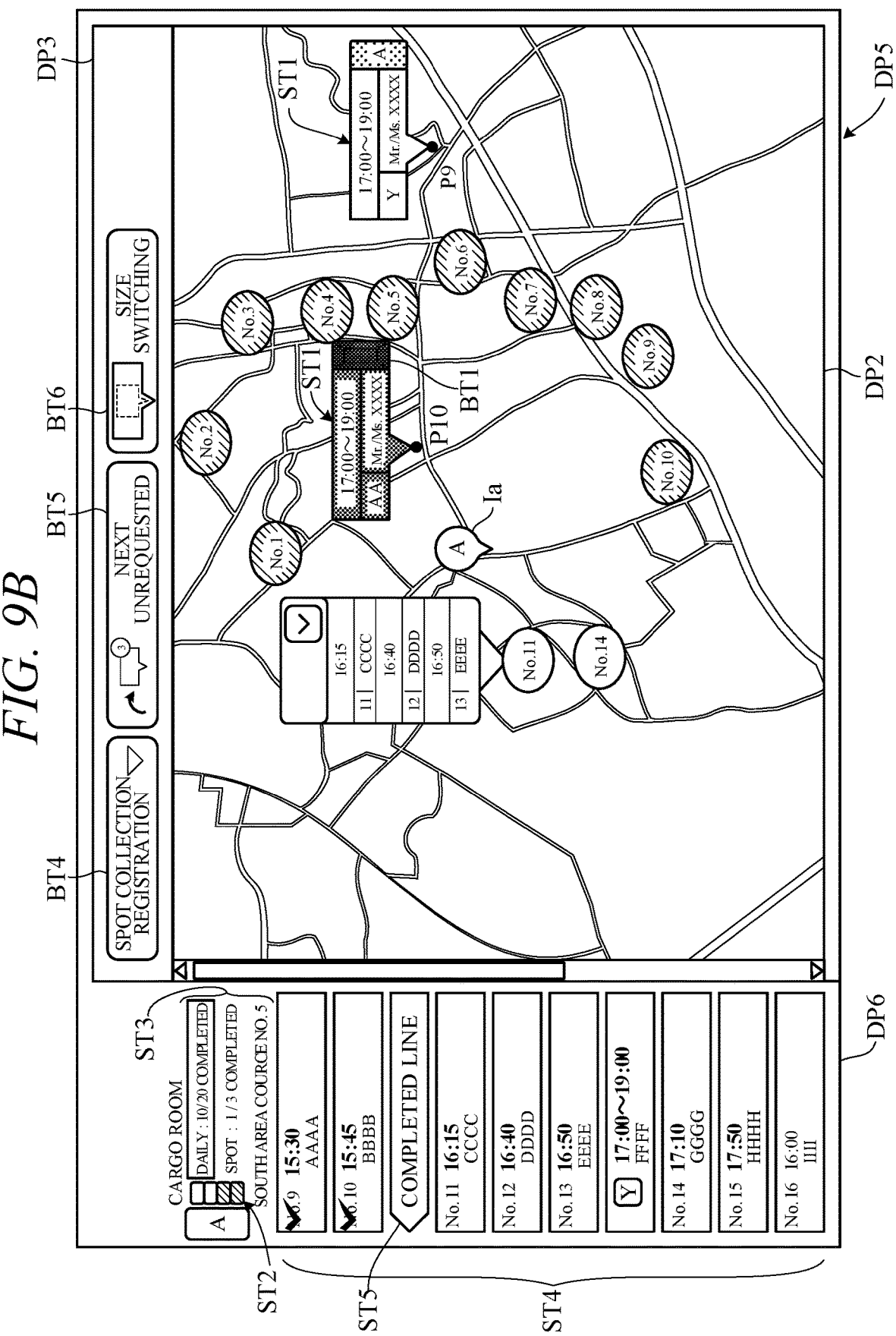
FIG. 9B is a diagram illustrating another example of the request status check screen of the manager terminal in FIG. 4.

FIG. 9B is a diagram illustrating another example of the request status check screen, and is a diagram illustrating an example of a request status check screen DP5 in the case of displaying the request status for a specific collection agent (A in the drawing). As illustrated in FIG. 9B, the peripheral map of the collection agent A is displayed on the map display area DP2 of the request status check screen DP5. The icons indicating the positions of the spot collection destinations P1 to P14 in which the collection agent A is responsible for the collection are displayed on the map display area DP2. The icons indicating the positions of the spot collection destinations P1 to P10 of the complete collections and the icons indicating the positions of the spot collection destinations P11 to P14 of the incomplete collections are displayed with different background colors or the like. The positions of the spot collection destinations P11 to P13 in the same building are collectively displayed by one icon. The peripheral spot collection destination is also displayed on the map display area DP2. In FIG. 9B, the icon images ST1 are displayed to indicate the spot collection destination P9 which is confirmed to be accepted by the collection agent A and the spot collection destination P10 not yet requested by the collection agent.

The request status check screen DP5 further displays a collection status screen DP6 indicating the progress status of collection by the collection agent A. In addition to the progress status of collection, the collection status screen DP6 displays the cargo room status ST2, which is transmitted from the collection agent terminal 1A to the management server 2 and is used by the collection agent A, of the vehicle 6A. The cargo room status indicates four stages of the status of the cargo room such as a situation in which the cargo room is full and no more collection is acceptable (100%), a situation in which a few more collection is acceptable (90%), a situation in which the cargo room is still a margin (60%), and a situation in which the cargo room is almost empty (30%) (60% in the drawing). The progress status of the collection in the collection status screen DP6 is displayed as the number of completed collections for each of daily collection and spot collection (status display ST3) and also as a list of collection requests in time series (status display ST4). In the status display ST4, the collection destinations are displayed in time series according to the designated time of the collection request, and an icon ST5 indicating a completion line is displayed between the display of the collection destinations (No. 9, No. 10) of the complete collections and the display of the collection destinations (No. 11 to No. 13, Y, No. 14 to No. 16) of the incomplete collections.

When the designation start button BT1 on the icon image ST1 indicating the unrequested spot collection destination P10 is pressed, the screen display can be switched to the collection agent designation screen DP1 for requesting the spot collection for the spot collection destination P10. The manager requesting the spot collection can check the progress status of the collection, the moving route, the current position, and the like of the specific collection agent A by checking the request status check screen DP5, and thus, the manager can request the spot collection by designating the collection agent A after examining whether the collection agent A is able to accept an additional spot collection.

Figure 10:
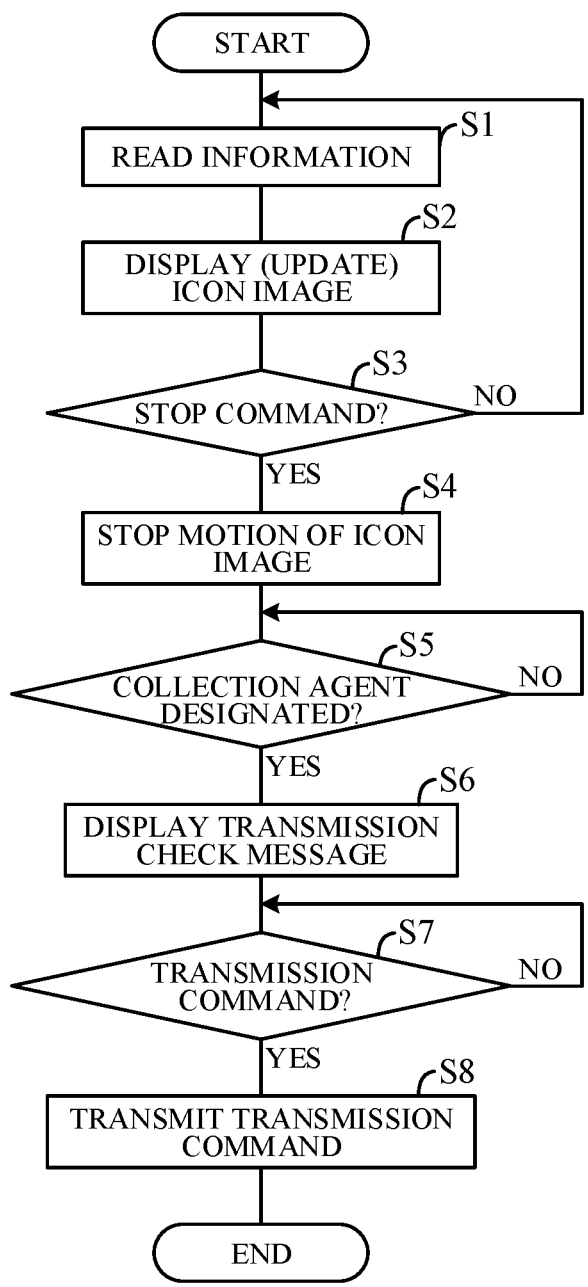
FIG. 10 is a flowchart illustrating an example of processing executed by the manager terminal in FIG. 4.

FIG. 10 is a flowchart illustrating an example of processing executed by the CPU of the manager terminal 3 according to a program stored in advance. The processing illustrated in this flowchart is started when the spot collection request information is input to the manager terminal 3, for example.

First, in step S1, the spot collection request information stored in the storage unit 31 is acquired by the processing of the collection request information acquisition unit 303, and the current position information or the like of the collection agents A and B or the vehicles 6A and 6B received from the management server 2 through the communication unit 32 is read by the processing of the server information acquisition unit 304. Next, in step S2, the icon images Ia to Ih on the map display area DP2 of the collection agent designation screen DP1 are displayed (updated) by the processing of the display control unit 301. Next, in step S3, it is determined whether or not the image stop command is input by the display stop unit 305. When it is determined to be affirmative in step S3, the process proceeds to step S4, and when it is determined to be negative, the process proceeds to step S1.

In step S4, by the processing of the display control unit 301, the update of the icon images Ia to Ih is stopped, and the icon images are fixedly displayed. Next, in step S5, it is determined whether or not the collection agent to which the spot collection request is to be transmitted is designated by the collection destination assignment unit 306. Step S5 is repeated until it is determined to be affirmative. When it is determined to be affirmative in step S5, the process proceeds to step S6, the transmission check message MSG2 of the spot collection request information and the transmission check button BT3 are displayed by the processing of the display control unit 301. Next, in step S7, it is determined whether or not the transmission command for spot collection request information is input. Step S7 is repeated until it is determined to be affirmative. When it is determined to be affirmative in step S7, the process proceeds to step S8, the transmission command is transmitted to the management server 2 through the communication unit 32.

As described above, the display of the icon image indicating the current position or the like of each collection agent is stopped in the latest state, and then the icon image is selected (steps S3 and S4). Thus, the manager can easily perform the selection operation of the icon image.

Operation of Request Processing System 100

Next, an example of the operation of the request processing system 100 will be described. Hereinafter, the operation on the collection agents C to H in addition to the collection agents A and B illustrated in FIG. 1 will be described. The collection agents C to H also have the same collection agent terminals 1C to 1H as those of the collection agents A and B and use vehicles 6C to 6H.

For example, at the time of departure from the delivery base, that is, at the start of business, the collection agents A to H input their own logins ID and passwords through the input units 15 on the login screens displayed on the display units 14 of the collection agent terminals 1A to 1H, respectively. When this input is made, the management server 2 performs connection processing with the collection agent terminals 1A to 1H. Thereafter, the collection agent terminals 1A to 1H communicate with the management server 2 at a predetermined time interval (for example, every three seconds), and for example, transmit the position information of the collection agents A to H to the management server 2. The communication between the collection agent terminals 1A to 1H and the management server 2 is continued until the collection agent terminals 1A to 1H perform logout operation.

On the other hand, the manager of the delivery base inputs the base manager ID and the password on the login screen displayed on the display unit 34 of the manager terminal 3 through the input unit 35. When this input is made, the management server 2 performs connection processing with the manager terminal 3. The manager receives a spot collection request from the customer through the window of the delivery base, the telephone, the Internet, and the like and operates the manager terminal 3 to input spot collection request information on the request input screen. In response to this input, the collection agent designation screen DP1 is displayed on the display unit 34 of the manager terminal 3, and the peripheral map of the spot collection destination P and the icon images Ia to Ih indicating the current positions of the collection agents A to H are displayed in the map display area DP2 (steps S1 and S2).

The display positions of the icon images Ia to Ih of the map display area DP2 are moved according to the current position information of the collection agents A to H, and the icon images Ia to Ih are changed according to the communication status between the management server 2 and the collection agent terminals 1A to 1H and the cargo room status of the vehicles 6A to 6H (steps S1 and S2). Accordingly, the manager can intuitively grasp the status of each of the collection agents A to H and decide a collection agent suitable for assigning the spot collection request. For example, it is possible to decide the collection agent E closest to the spot collection destination P from the collection agents E to H having a margin in the cargo room status and no problem in the communication status. At this time, by checking the number and distribution of the icon images PA indicating the positions of the collection destinations assigned to the respective collection agents, the busyness of the respective collection agents can be considered.

When the manager presses the designation start button BT1 on the icon image ST1 indicating the spot collection destination P displayed in the map display area DP2 of the collection agent designation screen DP1, the update of the icon images Ia to Ih is stopped, and the icon images are fixedly displayed (step S4). Accordingly, the manager can easily designate the desired collection agent E by pressing and selecting the icon image Ie corresponding to the collection agent E through the input unit 35 (touch panel) in a case where the icon images Ia to Ih of the map display area DP2 are stopped. The selected icon image Ie is highlighted (FIG. 7A and FIG. 7B).

When the manager selects the icon image Ie and designates the collection agent E, the transmission check message MSG2 for spot collection request and the transmission check button BT3 are displayed in the menu area DP3 (steps S5 and S6). When the manager presses the transmission check button BT3 through the input unit 35 (touch panel), the transmission command for transmitting spot collection request information to the collection agent E is transmitted to the management server 2, and the spot collection request information is transmitted from the management server 2 to the collection agent terminal 1E of the collection agent E (steps S7 and S8). When receiving the spot collection request information, the collection agent terminal 1E, for example, vibrates the collection agent terminal 1E to notify the collection agent E that the spot collection request information is received, and displays the received spot collection request information on the display unit 14. Accordingly, the collection agent E can grasp the spot collection request assigned to oneself.

The present embodiment can achieve advantages and effects such as the following:

(1) The image selection apparatus 5 includes: the information acquisition unit 202 and the server information acquisition unit 304 configured to acquire the position information of the collection agents A, B or the vehicles 6A, 6B; the display unit 34; the display stop unit 305 configured to input the image stop command; the display control unit 301 configured to control the display unit 34 so that the icon images Ia, Ib corresponding to the collection agents A, B or the vehicles 6A, 6B whose position information is acquired by the information acquisition unit 202 and the server information acquisition unit 304 is displayed on the display unit 34 and, when the image stop command is inputted by the display stop unit 305, motion of the icon images Ia, Ib displayed on the display unit 34 is stopped; and the collection destination assignment unit 306 configured to select arbitrary icon image from among the icon images Ia, Ib in response to the manager's operation during the motion of the icon images Ia, Ib is stopped by the display control unit 301 (FIG. 2 to FIG. 4). With this configuration, the icon images Ia and Ib which are displayed on the screen to correspond to the moving object can be easily selected in a stopped state.

(2) The display control unit 301 controls the display unit 34 to so that the icon images Ia, Ib are displayed simultaneously on map screen and displayed to be selectable in a plural number (FIG. 5, FIG. 7A, FIG. 7B). Accordingly, the status of each of the collection agents A and B or the vehicles 6A and 6B can be intuitively grasped through the screen display, and the appropriate icon images Ia and Ib can be selected. Further, in a case where one spot collection request is assigned to a plurality of collection agents and is requested to the collection agent accepted on a first-come-first-served basis, all the collection agents are in a stop state on the map screen, and thus the accuracy of examination and selection by the manager can be improved.

(3) The display stop unit 305 inputs the image stop command when the designation start button BT1 on map screen is pressed (FIG. 5, FIG. 7A to FIG. 9B). Accordingly, when the spot collection request displayed on the map screen is assigned to the collection agent, the collection destination and the collection agent of the spot collection request can be designated seamlessly. Thus, it is possible to provide a user interface with excellent usability and little input error by the user.

Incidentally, the above-described embodiment may be modified into various forms. Hereinafter, a modification will be described. In the above-described embodiment, an example is described in which the image selection apparatus 5 selects the icon image corresponding to the collection agent visiting the collection destination and requests the collection to the corresponding collection agent. However, any image selection apparatus may be used as long as the device selects the icon image corresponding to the moving object.

In the above-described embodiment, the collection request information acquisition unit 303 of the manager terminal 3 acquires the spot collection request information which is input through the input unit 35 to be stored in the storage unit 31 and transmits the information to the management server 2, and the information acquisition unit 202 of the management server 2 acquires the transmitted spot collection request information. However, the configuration of the request information acquisition unit which acquires the information of the request is not limited thereto. For example, the information acquisition unit 202 of the management server 2 may be configured to directly receive the spot collection request information which the requester of the spot collection transmits through the own smartphone or personal computer.

In the above-described embodiment, the display unit 14 displays the spot collection request information and the like. However, the notification may be made by, for example, sound, vibration, lighting or flashing of a light in addition to the screen display.

In the above-described embodiment, the information acquisition unit 202 and the server information acquisition unit 304 acquire the current position information of the collection agents A and B or the vehicles 6A and 6B thereof detected by a GPS sensor 13a. However, the configuration of the position information acquisition unit which acquires the position information of a plurality of moving objects is not limited thereto. For example, the current position information detected by autonomous navigation may be acquired on the basis of changes in the values of a gyro sensor and an acceleration sensor.

In the above-described embodiment, the image stop command is inputted by the designation start button BT1 displayed on the display unit 34. However, the configuration of the stop command input unit for inputting the image stop command is not limited thereto. For example, the image stop command may be input through a physical switch such as a numeric keypad, voice input, or the like.

The above description is only an example, and the present invention is not limited to the above embodiment and modifications, unless impairing features of the present invention. The above embodiment can be combined as desired with one or more of the above modifications. The modifications can also be combined with one another.

REFERENCE SIGNS LIST 1A, 1B collection agent terminal, 2 management server, 3 manager terminal, 4 network, 5 image selection apparatus, 6A, 6B vehicle, 10 control unit, 11 storage unit, 12 wireless unit, 13 sensor unit, 13a GPS sensor, 13b gyro sensor, 14 display unit, 15 input unit, 20 control unit, 21 storage unit, 22 communication unit, 24 display unit, 25 input unit, 30 control unit, 31 storage unit, 32 communication unit, 34 display unit, 35 input unit, 100 request processing system, 101 display control unit, 102 connection processing unit, 103 position information notification unit, 104 cargo room status notification unit, 201 connection processing unit, 202 information acquisition unit, 203 collection destination information registration unit, 204 information output unit, 211 collection agent information area, 212 vehicle information area, 213 collection destination information area, 214 map information area, 301 display control unit, 302 connection processing unit, 303 collection request information acquisition unit, 304 server information acquisition unit, 305 display stop unit, 306 collection destination assignment unit.

The invention claimed is:
1. An image selection apparatus, comprising:
a display unit configured to display a map screen; and
a microprocessor and a memory coupled to the microprocessor, wherein the microprocessor is configured to function as:
a position information acquisition unit configured to acquire position information of a plurality of moving objects moving toward a predetermined destination;
a display control unit configured to control the display unit so that a plurality of first icon images respectively corresponding to the plurality of moving objects whose position information is acquired by the position information acquisition unit is displayed as a plurality of moving images moving on the map screen in response to motion of the plurality of moving objects; and an input unit configured to input a command from a user to the plurality of first icon images, wherein the command includes a stop command to stop motion of the plurality of first icon images and a selection command to select a specific first icon image from among the plurality of first icon images, wherein the display control unit controls the display unit so that a second icon image corresponding to a new destination different from the predetermined destination is displayed on the map screen together with the plurality of the first icon images and, when the stop command is inputted by the input unit in response to operation by the user to the second icon image, controls the display unit to stop updating the plurality of first icon images in response to motion of the plurality of moving objects so that the plurality of first icon images is fixedly displayed, wherein the input unit inputs the selection command to select the specific first icon image from among the plurality of first icon images fixedly displayed, and wherein the display control unit controls the display unit so that the plurality of first icon images is displayed in a first mode simultaneously on the map screen and the specific first icon image is displayed in a second mode different from the first mode on the map screen when the selection command is inputted.

2. The image selection apparatus according to claim 1, wherein the plurality of moving objects is a plurality of agents patrolling predetermined visiting destinations, wherein the selection command is a command to select an agent who visits a new visiting destination from among the plurality of agents.

3. The image selection apparatus according to claim 1, wherein the second icon image is displayed as a button image.

4. An image selection apparatus, comprising:

a display, unit configured to display a map screen; and a microprocessor and a memory coupled to the microprocessor, wherein the microprocessor is configured to perform:

acquiring position information of a plurality of moving objects moving toward a predetermined destination;

controlling the display unit so that a plurality of first icon images respectively corresponding to the plurality of moving objects whose position information is acquired is displayed as a plurality of moving images moving on the map screen in response to motion of the plurality of moving objects; and inputting a command from a user to the plurality of first icon images, wherein the command includes a stop command to stop motion of the plurality of first icon images and a selection command to select a specific first icon image from among the plurality of first icon images, wherein the microprocessor is configured to perform:

the controlling including controlling the display unit so that a second icon image corresponding to a new destination different from the predetermined destination is displayed on the map screen together with the plurality of the first icon images and, when the stop command is inputted in response to operation by the user to the second icon image, controlling the display unit to stop updating the plurality of first icon images in response to motion of the plurality of moving objects so that the plurality of first icon images is fixedly displayed; and the inputting including inputting the selection command to select the specific first icon image from among the plurality of first icon images fixedly displayed, and wherein the controlling including controlling the display unit so that the plurality of first icon images is displayed in a first mode simultaneously on the map screen and the specific first icon image is displayed in a second mode different from the first mode on the map screen when the selection command is inputted.

5. The image selection apparatus according to claim 4, wherein the plurality of moving objects is a plurality of agents patrolling predetermined visiting destinations, wherein the selection command is a command to select an agent who visits a new visiting destination from among the plurality of agents.

6. The image selection apparatus according to claim 4, wherein the second icon image is displayed as a button image.

* * * * *